Feb. 26, 1929.
M. LOUGHEAD
1,703,313
FLUID OPERATED BRAKE SYSTEM
Filed July 10, 1925   2 Sheets-Sheet 2
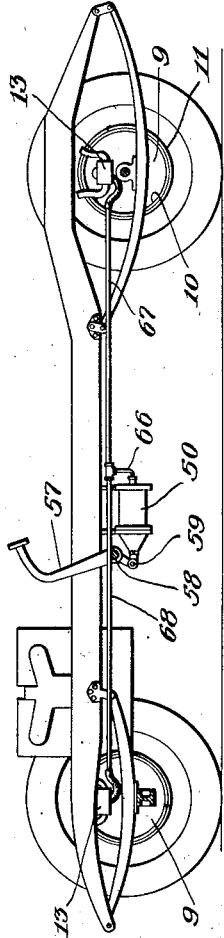
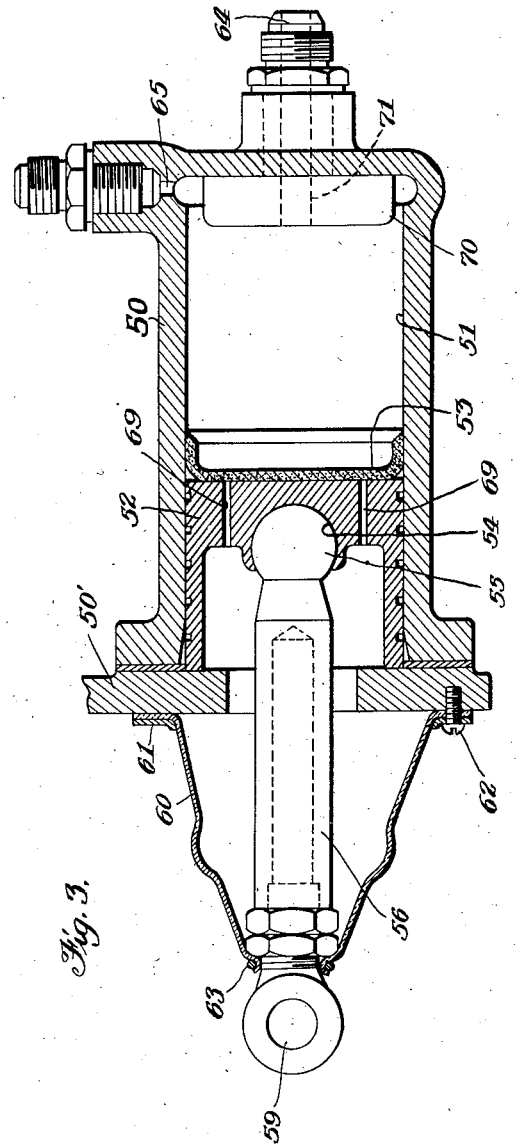
Inventor
Malcolm Loughead
By Williams, Bradbury,
McCaleb & Kinkle
Attys.

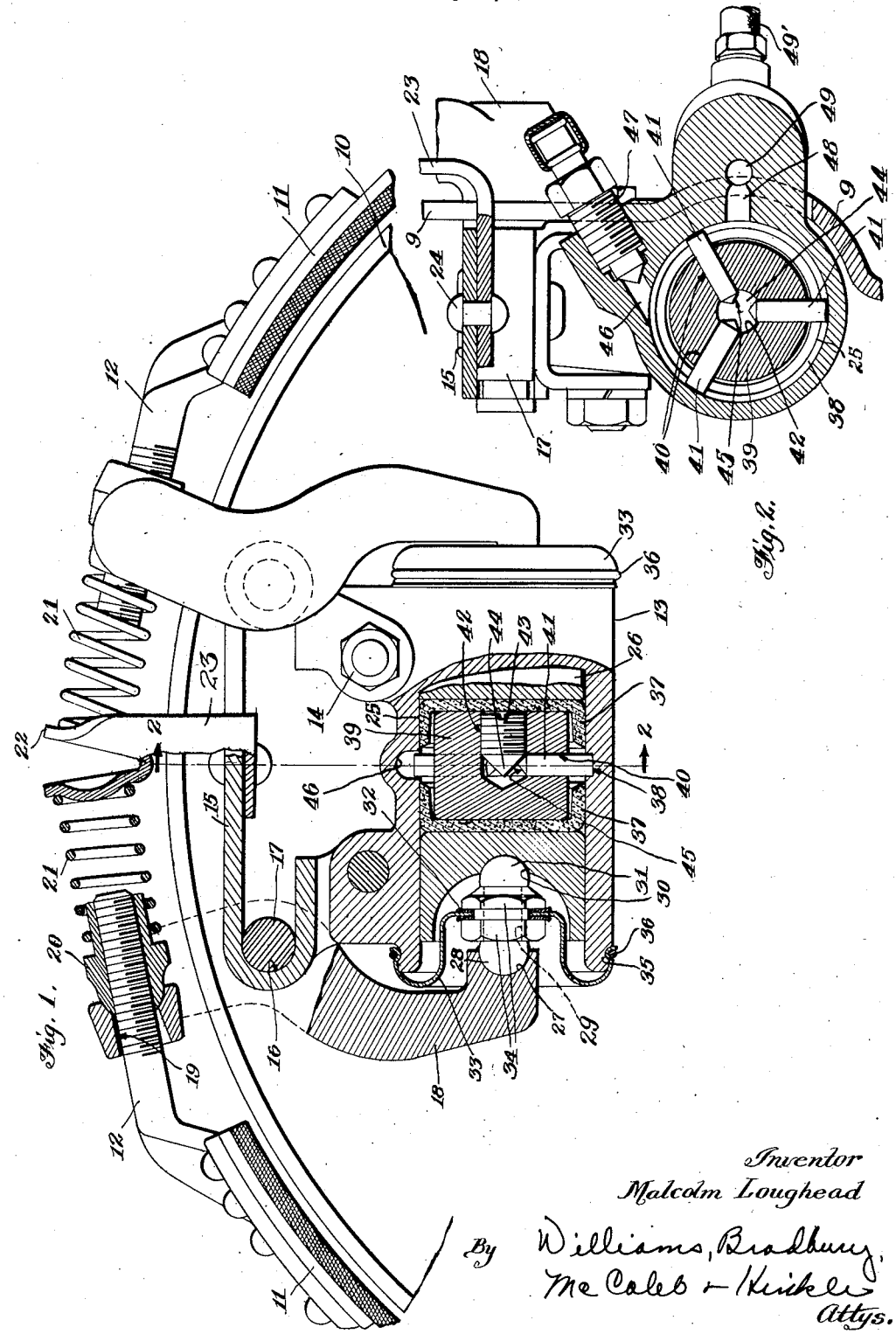

Patented Feb. 26, 1929.

1,703,313

UNITED STATES PATENT OFFICE.

MALCOLM LOUGHEAD, OF DETROIT, MICHIGAN, ASSIGNOR TO HYDRAULIC BRAKE COMPANY, OF DETROIT, MICHIGAN, A CORPORATION OF CALIFORNIA.

FLUID-OPERATED BRAKE SYSTEM.

Application filed July 10, 1925. Serial No. 42,848.

This invention relates to fluid operated brake systems for vehicles, such as are used in connection with automobiles.

One of the objects of the invention is the provision of a brake operating cylinder and parts associated therewith which will be simple in construction, durable in operation, and which will reduce, so far as possible, the amount of liquid required in the braking system.

Other objects and features will appear from time to time as the description of the invention progresses.

In a system such as the one herein disclosed, a brake operating cylinder is provided in association with each of the brake wheels. In addition, a main compressor cylinder is provided, the piston of which, in the present embodiment of the invention, is adapted to be operated by a foot-actuated lever. Tubes are provided which connect the main compressor cylinder to the cylinders which are individual to the respective brake wheels.

A system of this type requires for its best operation that the amount of liquid in the system shall be approximately a certain predetermined amount by volume. If the volume of liquid within the system is too great, the liquid within the brake operating cylinders may prevent the full retraction of the pistons. If, however, the liquid within the system is of insufficient volume, the operation of the piston in the main compressor cylinder may not act to fully set the brakes.

It has been found that the solution of oil and alcohol used as the brake operating liquid in systems of this type expands materially when subjected to heat, and contracts upon becoming cold. Thus, a system which contains the proper volume of liquid to act satisfactorily at a high temperature, when subjected to a materially lower temperature may act unsatisfactorily due to the contraction of the brake operating liquid.

The present invention provides means whereby the amount of liquid normally existing in the system is reduced substantially to its minimum, thus materially reducing the variation in the volume of the liquid due to expansion and contraction.

It is believed the invention will be understood most readily from a detailed description thereof taken in connection with the accompanying drawings, in which—

Figure 1 is a view of a portion of the brake mechanism of an automobile wheel, showing the brake operating cylinder partly in section, associated therewith;

Figure 2 is a section substantially on the line 2—2 of Figure 1;

Figure 3 is a section through the main compressor cylinder, and

Figure 4 is a diagrammatic view showing an automobile chassis with applicant's brake system associated therewith.

Referring now to the drawings, in which like reference characters indicate the same parts in the several views, 10 indicates a portion of the brake drum about which is a brake band, the ends of which are shown at 11. Secured to each of the ends 11 of the brake band is a threaded lug 12. At 13 is shown the block for the brake operating cylinder.

It may be here explained that the braking system herein disclosed is very similar to that disclosed in applicant's application, Serial No. 680,292, filed December 13, 1923. The present invention differs from that shown in applicant's prior filed application merely in the parts which are directly associated with the brake operating cylinder and main compressor cylinder, and not in the general arrangement of the system.

The brake block 13 may be rigidly secured to the dust guard or cover plate 9 for the brake drum 10 in a manner similar to that disclosed in applicant's application mentioned above. Fixed to the brake block 13 by means of the bolts 14 is the yoke member 15, the opposite ends of which are rebent to form the bearings 16 within which are positioned the pivotal supporting members 17 which project laterally from the brake operating levers 18. The upper end of each of the brake operating levers 18 is provided with an opening 19 through which projects one of the threaded lugs 12. Nuts 20 are provided on the threaded lugs 12 to form an abutment for the upper ends of the levers 18. Springs 21 are provided, each of which has one of its ends in engagement with a nut 20, the opposite end being in engagement with a fixed abutment 22 carried at the upper end of an arm 23 secured to the yoke 15 by means of rivets 24. All this is substantially as described in applicant's above mentioned application.

The block 13 is provided with the central cylindrical opening 25 within which are positioned the oppositely displaceable pistons 26. The lower end of each of the levers 18 is provided with a substantially hemi-spherical recess 27 adapted to receive the rounded end 28 of the piston rod 29. Each of the pistons 26 is provided with a similar hemi-spherical recess 30 arranged to receive the opposite rounded end 31 of the piston rod 29.

It is to be understood that the mechanisms associated with the two pistons are identical, and only one of the pistons and its associated parts will, therefore, be described in detail.

Positioned about the piston rod 29 is a pair of washers 32 between which is the edge of a dust-excluding apron 33, the washers being forced into firm engagement with the opposite sides of the edge of the apron 33 by means of the nuts 34 threaded onto the piston rod 29. The cylinder block 13 is provided adjacent to the end thereof with the circumferential groove 35, and the outer edge of the apron 33 is secured within the groove 35 by a tension device 36 of wire, cord, or other desired character. The apron 33 may be formed of rubber similar to the inner tube of an automobile tire or other suitable material. This arrangement provides a means whereby all dust and moisture are positively prevented from entering the cylinder.

In the structure herein disclosed, each of the pistons is provided with a packing member 37 formed of hard vulcanized rubber or rubber composition. The packing member 37 has the form of the ordinary cup leather, but, unlike the usual cup leather, is not secured in any way to the piston but is maintained in engagement therewith solely by the pressure of the liquid within the system. However, a packing member or cup leather such as disclosed in applicant's above mentioned application may be employed with good results.

The cylinder block 13 is provided centrally of the cylinder 25 with a circumferential groove 38. Positioned centrally of the cylinder 25 is a block 39 of iron or other solid material. The block 39 has three radially extending equiangularly positioned drills 40 within each of which is slidably positioned a pin 41. The block 39 is provided with the central longitudinally extending threaded drill 42 within which is the screw threaded member 43 provided with a cone-shaped end 44. The inner ends of the pins 41 are tapered, as indicated at 45, and the cone-shaped end 44 of threaded member 43 is adapted to engage the tapered ends of the pins 41 and force the outer ends of said pins into the groove 38 within the cylinder wall, thus firmly anchoring the block 39 centrally of the cylinder. The opposite ends of the block 39 are arranged to project into the cup-shaped packing members 37 so that when the pistons 26 are in their normal positions, practically all the liquid is forced out of the brake operating cylinders. This structure acts very materially to reduce the amount of liquid required in the system and at the same time provides an easily installed and durable central stop for the pistons 26.

At the top of the cylinder is a bleeder opening 46 through which any air in the system may be permitted to escape. The opening 46 is normally closed by means of the screw threaded valve member 47. Liquid under pressure is admitted centrally of the cylinder through the opening 48 which communicates through the drill 49 and hose 49' with the tube 67, 68 by means of which the liquid is conveyed to the cylinder. This detail of the structure forms no part of the present invention, as any desired means may be employed for conveying the liquid to the cylinder between the edges of the packing members when in normal position.

Referring now to Figure 3, 50 indicates the block of the main compressor cylinder which is rigidly supported from the vehicle chassis in any desired manner. In the present embodiment, the open end of the cylinder is shown as abutting the frame member 50' to which it is secured through the medium of bolts, cap screws, or other desired means. The block 50 has the cylindrical bore 51 within which the piston 52 is slidably arranged. The piston 52 is provided with the packing member 53 which, except for size, may be substantially the same as the packing members 37 shown in connection with the brake operating cylinder. The piston 52 is formed with a substantially hemi-spherical recess 54 arranged to receive the rounded end 55 of the piston rod 56.

The brake operating lever 57 is pivotally supported at 58 and the lower end is pivotally joined to the end of the piston rod 56, as indicated at 59. A tapered leather or rubber boot 60 is provided about the projecting end of the piston rod 56. The larger end of the boot 60 is turned outwardly and is clamped to the frame member 50' by means of the clamping ring 61, screws 62 being provided to hold ring 61 in clamping position. The smaller end of the boot 60 is secured to the piston rod 56 adjacent to the outer end thereof by means of the wire or cord 63. The outlet from the compressor cylinder is indicated at 64. At 65 is shown an opening through which the air within the system may escape or through which liquid may be added to the system when required.

Referring now to Figure 4, it will be noted that the outlet opening 64 of the compressor cylinder 50 is joined by means of tube 66 to the tubes 67 and 68 which extend, respectively, to the rear and forward brake operating cylinders 13. It is to be understood, of course, that the compressor cylinder 50 is also joined to the brake operating cylinders on the opposite sides of the vehicle.

The operation of the system will now be described.

Assuming that the brake operating mechanism is in normal position, the pistons 26 will be forced into engagement with the blocks 39 by means of the expansion springs 21, and the compressor cylinder piston 52 will be forced to its retracted position by means of the liquid which has been expelled from the cylinders 25 by means of the springs 21. If now it is desired to actuate the brakes, the driver will force the upper end of the foot lever 57 forwardly, thus causing the lower end of said lever to move to the right, as viewed in Figure 4. This will cause the piston 52 of the compressor cylinder 51 to move to the right as viewed in Figures 3 and 4 and expel the liquid from the main compressor cylinder. The liquid expelled from the compressor cylinder 51 will travel through the tubes 66, 67 and 68 to the brake operating cylinders 25 of the several wheels, where it will enter between the adjacent edges of the packing members 37. The liquid entering the cylinders 25 will cause the pistons 26 to be moved in opposite directions from each other, thus separating the lower ends of the levers 18, and forcing the upper ends of said levers toward each other, tightening the brake band about the brake drums 10.

When it is desired to release the brakes, pressure is removed from the foot lever 57. The tension in the compression springs 21 now acts to force the upper ends of the levers 18 from each other, and the lower ends of the levers toward each other, thus expelling the liquid from the brake operating cylinders and causing it to travel in a reverse direction through the tubes 67, 68 and 66 back into the main compressor cylinder 51. The liquid entering the cylinder 51 causes the piston 52 to be displaced to the left, as seen in Figures 3 and 4. The braking apparatus has now been returned to its normal inoperative position.

In order to reduce any possibility of the piston 52 operating forcibly to withdraw the packing member 53, the piston may be provided with a plurality of relief drills 69. If desired, the end of the cylinder 51 may also be provided with a block 70 about which the cup-shaped packing member 53 will be positioned when the piston 52 is in operative position. The block 70 will be provided with a bore 71 which communicates with the outlet 64 from the cylinder.

While in the drawings and in the above description applicant has described merely one embodiment of his invention, it is to be understood that various modifications in the details are contemplated and the invention, therefore, is to be limited merely by the scope of the appended claims.

Having thus described my invention, what I claim as new and desire to secure by Letters Patent of the United States is:

1. In a fluid operated brake system, a cylinder, a pair of oppositely displaceable pistons in said cylinder, substantially cup-shaped packing members for said pistons respectively, and a limiting stop member mounted substantially centrally of said cylinder and arranged to project into and substantially fill said packing members when said pistons are in normal position.

2. In a fluid operated brake system, a cylinder, a piston slidable therein, a cup shaped floating packing member for the piston at the end face thereof, and an aligning member disposed within the cylinder and arranged to project into and aid in positioning said floating packing member when said piston is at its innermost position.

3. In a fluid operated brake system, a cylinder, a piston slidable in said cylinder, a circumferential groove within said cylinder, a stop member for said piston arranged within said cylinder, pins slidably mounted in said stop member, and means carried by said stop member for forcing said pins outwardly into said groove.

4. In a fluid operated brake system, a cylinder, a piston slidable in said cylinder, a circumferential groove within said cylinder, a stop member for said piston arranged within said cylinder, radially extending pins slidably mounted in said stop member, and a member screw threaded into said stop member and provided with a cone-shaped end adapted to engage the inner ends of said pins and force the outer ends of said pins outwardly into said groove.

5. In a fluid operated brake system, a cylinder, a pair of oppositely displaceable pistons within said cylinder, a circumferential groove arranged substantially midway of said cylinder, a stop member arranged within said cylinder, radially extending pins slidably mounted in said stop member, and a member screw threaded into said stop member and extending substantially at right angles to said pins, said screw threaded member being provided with a tapered end adapted to engage the inner ends of said pins and force the outer ends of said pins into said groove.

6. In a fluid operated brake system, a cylinder, a piston therein, a piston rod for the piston having a pivotal connection with the piston and a dust excluding flexible apron through which said piston rod passes, said apron having its inner edge secured to said piston rod at a point on the piston rod within the cylinder, said apron being provided with a bead at its outer edge adapted to be received and to fit within an annular groove at the outer wall of the cylinder adjacent to the mouth of the cyilnder whereby the apron is folded over the edges of the cylinder mouth.

7. The combination with a hydraulic brake system comprising a master compressor, a brake actuating cylinder and piston, a column of expansible and contractible but non-compressible fluid operatively connecting the compressor and the piston, of a cup-shaped packing member for the end of the piston and fluid displacing means within and carried by the cylinder and arranged to displace substantially all of the fluid within the cup-shaped packing member when the piston is at its innermost position.

8. A hydraulic brake system comprising a pair of fluid motors, one constituting a compressor and the other a brake actuating motor, a column of expansible and contractible but non-compressible fluid operatively interconnecting the respective motors, one of the motors comprising a cylinder and piston therefor having a cup-shaped packing member at its end, and a stop member carried by the cylinder and arranged to enter, and displace substantially all of the fluid within, the cup-shaped packing member when the piston comes to its innermost position.

9. A hydraulic brake system comprising a pair of fluid motors, one constituting a compressor and the other a brake actuating motor, a column of expansible and contractible but non-compressible fluid operatively interconnecting the respective motors, one of the motors comprising a cylinder and piston therefor having a cup-shaped packing member at its end, and a member carried by the cylinder and arranged to enter, and displace substantially all of the fluid within, the cup-shaped packing member when the piston comes to its innermost position.

In witness whereof, I hereunto subscribe my name this 3rd day of July, 1925.

MALCOLM LOUGHEAD.